O. C. HALE.
Apparatus for Destroying Insects

No. 220,072.          Patented Sept. 30, 1879.

Witnesses:

Inventor:
O. C. Hale,
per
F. A. Lehmann,
atty.

UNITED STATES PATENT OFFICE.

ORLANDO C. HALE, OF OGDEN, OHIO, ASSIGNOR OF ONE-HALF OF HIS RIGHT TO S. G. GREEN, OF SAME PLACE.

IMPROVEMENT IN APPARATUS FOR DESTROYING INSECTS.

Specification forming part of Letters Patent No. 220,072, dated September 30, 1879; application filed May 17, 1879.

*To all whom it may concern:*

Be it known that I, ORLANDO C. HALE, of Ogden, in the county of Clinton and State of Ohio, have invented certain new and useful Improvements in Insect-Destroyers; and I do hereby declare the following to be a full, clear, and exact description of the invention, such as will enable others skilled in the art to which it pertains to make and use it, reference being had to the accompanying drawings, which form part of this specification.

My invention relates to an improvement in insect-destroyers; and it consists in the combination of a pail or vessel, to be filled with water, a stand placed therein, a lamp, and perforated cylinder, whereby the insects and moths are destroyed by being burned by the flame, or striking against the cylinder, and then dropping down into the water, as will be more fully described hereinafter.

Figure 1:
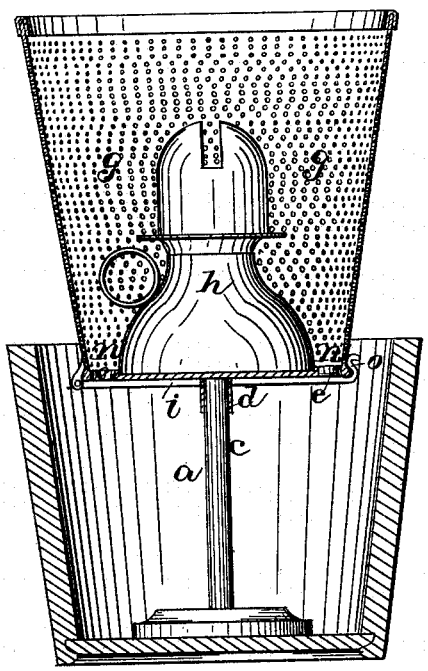
Figure 2:
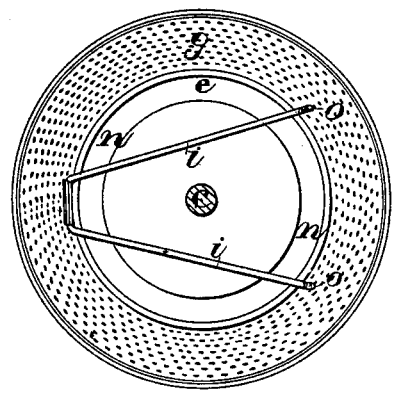

Figure 1 is a vertical section of my invention, and Fig. 2 is an inverted view of the perforated cylinder and its hinged bottom.

*a* represents a bucket or vessel of any kind, which is to be filled with water, and in which is placed a stand, *c*. The upper end of this stand fits in a socket, *d*, on the under side of the hinged bottom *e* of the perforated cylinder *g*, which surrounds the lamp *h*.

The hinge of the bottom *e* consists of the bent wire *i*, which is soldered to the bottom, and which has its free ends formed into catches *o*, to snap up over the flange around the bottom of the cylinder. When the parts are properly proportioned the cylinder may be folded back out of the way, for the purpose of giving ready access to the lamp, and for cleaning out the dead insects which have fallen down around the lamp without the trouble of removing the whole apparatus.

The bottom *e* is made of less diameter than the lower end of the cylinder, so as to leave a space, *n*, all around the bottom for the insects that have been scorched by the blaze of the lamp to fall down through into the water below. Should the moths or other insects not be killed at once by the blaze in their flutterings to get out of the cylinder, they drop down through the opening *n* and get drowned. As the light shines through the perforations of the cylinder, moths, and other insects attracted by the light fly against the cylinder with such force as to stun them, when they drop down into the water in the bucket.

Having thus described my invention, I claim—

In an insect-destroyer, the combination of a bucket or vessel, *a*, standard *c*, gauze cylinder *g* opened at its top, and lamp *h*, there being a space between the lower edge of the lamp and the bottom of the gauze for the insects to fall through, substantially as shown and described.

In testimony that I claim the foregoing I have hereunto set my hand this 3d day of May, 1879.

ORLANDO C. HALE.

Witnesses:
 J. V. ELLIS,
 N. R. NEUMAN.